(12) United States Patent
Yoshida (10) Patent No.: US 11,118,501 B2
(45) Date of Patent: Sep. 14, 2021

(54) TURBINE AND TURBOCHARGER INCLUDING THE SAME

(71) Applicant: MITSUBISHI HEAVY INDUSTRIES ENGINE & TURBOCHARGER, LTD., Sagamihara (JP)

(72) Inventor: Toyotaka Yoshida, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 80 days.

(21) Appl. No.: 16/610,200

(22) PCT Filed: Oct. 31, 2017

(86) PCT No.: PCT/JP2017/039271
§ 371 (c)(1),
(2) Date: Nov. 1, 2019

(87) PCT Pub. No.: WO2019/087279
PCT Pub. Date: May 9, 2019

(65) Prior Publication Data
US 2021/0087969 A1 Mar. 25, 2021

(51) Int. Cl.
*F02B 39/00* (2006.01)
*F01D 9/02* (2006.01)
*F02C 6/12* (2006.01)

(52) U.S. Cl.
CPC .............. *F02B 39/00* (2013.01); *F01D 9/026* (2013.01); *F02C 6/12* (2013.01); *F05D 2220/40* (2013.01);
(Continued)

(58) Field of Classification Search
CPC .......... F01D 9/026; F01D 9/048; F02B 39/00; F02C 6/12; F05B 2260/231;
(Continued)

(56) References Cited

U.S. PATENT DOCUMENTS 5,087,176 A * 2/1992 Wieland .................. F01D 5/025
415/177
9,212,700 B1 12/2015 Bucking et al.
(Continued)

FOREIGN PATENT DOCUMENTS

CN 107076015 A 8/2017
DE 102009056632 A1 6/2011
(Continued)

OTHER PUBLICATIONS

Chinese Office Action and Search Report for Chinese Application No. 201780089715.0, dated Jan. 28, 2021.
(Continued)

*Primary Examiner* — Jesse S Bogue
(74) *Attorney, Agent, or Firm* — Birch, Stewart, Kolasch & Birch, LLP (57) ABSTRACT

A turbine includes a turbine impeller, a turbine housing disposed so as to cover the turbine impeller and internally forming a scroll flow passage through which an exhaust gas flows, and a throat forming portion which is provided as a separate piece from the turbine housing. The throat forming portion is disposed to face a section of the turbine housing and forms a hub-side wall surface of a throat portion of the scroll flow passage in an axial direction, the section forming a shroud-side wall surface of the throat portion.

7 Claims, 8 Drawing Sheets

(52) U.S. Cl.
  CPC ...... *F05D 2240/15* (2013.01); *F05D 2250/51* (2013.01)

(58) Field of Classification Search
  CPC ............. F05D 2220/40; F05D 2230/54; F05D 2240/14; F05D 2240/15; F05D 2250/51; F05D 2260/39; F05D 2260/84
  See application file for complete search history.

(56) References Cited

U.S. PATENT DOCUMENTS

| | | | | |
|---|---|---|---|---|
| 9,683,456 | B2* | 6/2017 | Burmester | F02C 7/24 |
| 9,988,977 | B2* | 6/2018 | Crandall | F02B 39/14 |
| 2007/0089414 | A1 | 4/2007 | Yokoyama et al. | |
| 2010/0232937 | A1* | 9/2010 | Wengert | F01D 17/165 |
| | | | | 415/160 |
| 2011/0014036 | A1* | 1/2011 | Boening | F16F 1/324 |
| | | | | 415/177 |
| 2015/0037146 | A1 | 2/2015 | Yamaguchi et al. | |
| 2017/0204743 | A1 | 7/2017 | Yokoyama et al. | |
| 2017/0298761 | A1 | 10/2017 | Williams et al. | |
| 2019/0063260 | A1 | 2/2019 | Kitamura et al. | |

FOREIGN PATENT DOCUMENTS

| | | |
|---|---|---|
| EP | 3 187 710 A1 | 7/2017 |
| JP | 58-5429 A | 1/1983 |
| JP | 58-32923 A | 2/1983 |
| JP | 58-158125 U | 10/1983 |
| JP | 58-161131 U | 10/1983 |
| JP | 60-27814 B2 | 7/1985 |
| JP | 60-118343 U | 8/1985 |
| JP | 62-145948 U | 9/1987 |
| JP | 63-123732 U | 8/1988 |
| JP | 10-252490 A | 9/1998 |
| JP | 11-229887 A | 8/1999 |
| JP | 2007-113501 A | 5/2007 |
| JP | 2012-211544 A | 11/2012 |
| JP | 2013-15033 A | 1/2013 |
| JP | 2013-174129 A | 9/2013 |
| WO | WO 2016/071959 A1 | 5/2016 |
| WO | WO 2017/154069 A1 | 9/2017 |

OTHER PUBLICATIONS

Extended European Search Report for European Application No. 17930530.5, dated Mar. 17, 2021.
Office Action dated Aug. 25, 2020 issued in counterpart Japanese Application No. 2019-550029, with Machine Translation.
International Preliminary Report on Patentability and Written Opinion of the International Searching Authority for International Application No. PCT/JP2017/039271, dated May 14, 2020, with English translation.
International Search Report for International Application No. PCT/JP2017/039271, dated Dec. 12, 2017.
Japanese Office Action for Japanese Application No. 2019-550029, dated Jun. 2, 2020, with English translation.

* cited by examiner

Axial direction

Axial direction

FIG. 8

Axial direction

TURBINE AND TURBOCHARGER INCLUDING THE SAME

TECHNICAL FIELD

The present disclosure relates to a turbine and a turbocharger including the same.

BACKGROUND

In general, in an internal combustion engine for a ship, an automobile, or the like, a turbocharger is known which rotates a turbine impeller by using an exhaust energy thereof and rotating a compressor impeller disposed coaxially with the turbine impeller, thereby increasing a suction pressure of the internal combustion engine and an output of the internal combustion engine.

Patent Document 1 and Patent Document 2 each disclose a turbocharger with a turbine housing disposed so as to cover a turbine impeller.

CITATION LIST

Patent Literature

Patent Document 1: JP2013-174129A
Patent Document 2: JPH11-229887A

SUMMARY

Technical Problem

In recent years, in the field where downsizing of an internal combustion engine is promoted, downsizing of a turbocharger itself is also required accordingly. Since a turbine housing is typically formed by casting, feasibility of a core forming an inner wall shape of the turbine housing is important. However, if the turbocharger is downsized upon the recent requirement, it may become difficult to form the core forming the inner wall shape of the turbine housing, resulting in a decrease in feasibility of the core. In particular, since a throat portion of a scroll flow passage has a smaller width than other sections, feasibility of the core owing to downsizing of the turbocharger is likely to raise an issue.

Thus, in view of the above issue, an object of at least one embodiment of the present invention is to provide a turbine housing and a turbocharger including the same capable of improving formability of the inner wall shape of the turbine housing by casting while promoting downsizing of the turbocharger.

Solution to Problem (1) A turbine according to some embodiments of the present invention includes a turbine impeller, a turbine housing disposed so as to cover the turbine impeller and internally forming a scroll flow passage through which an exhaust gas flows, and a throat forming portion which is provided as a separate piece from the turbine housing.

The throat forming portion is disposed to face a section of the turbine housing and forms a hub-side wall surface of a throat portion of the scroll flow passage in an axial direction, the section forming a shroud-side wall surface of the throat portion.

With the above configuration (1), in the throat portion of scroll flow passage having a smaller width in the axial direction than other sections, the hub-side wall surface facing the shroud-side wall surface can be formed by the throat forming portion which is provided as the separate piece from the turbine housing. Therefore, even if the turbine is downsized, it is possible to facilitate formation of a core forming an inner wall shape upon casting the turbine housing and to enhance formability of the inner wall shape of the turbine housing.

(2) In some embodiments, in the above configuration (1), the throat forming portion includes a first part forming the hub-side wall surface of the throat portion, and a second part facing a back surface of the turbine impeller on an inner side of the first part in a radial direction.

With the above configuration (2), since the throat forming portion includes the first part forming the hub-side wall surface of the throat portion and the second part facing the back surface of the turbine impeller, it is possible to use the throat forming portion as a portion facing the back surface of the turbine impeller as well. With such a simple structure, it is possible to improve feasibility of the core in casting of the turbine housing and to suppress heat radiation of the exhaust gas on the side of the back surface of the turbine impeller.

(3) In some embodiments, in the above configuration (1) or (2), the throat forming portion includes a plate member forming the hub-side wall surface of the throat portion.

With the above configuration (3), since the plate-like member can be adopted as the throat forming portion, it is possible to form the hub-side wall surface of the throat portion by using a sheet metal product (for example, a generally used back plate or the like).

(4) A turbine according to some embodiments of the present invention includes a turbine impeller, a turbine housing disposed so as to cover the turbine impeller and including an outlet portion for discharging an exhaust gas having passed through the turbine impeller, and a heat shield portion positioned on an opposite side of the outlet portion in an axial direction across at least one of the turbine impeller or a scroll flow passage communicating with the turbine impeller.

The heat shield portion includes a first heat-shielding plate portion, and a second heat-shielding plate portion arranged to at least partially have a gap with the first heat-shielding plate portion.

One of the "first heat-shielding plate portion" or the "second heat-shielding plate portion" constituting the heat shield portion may constitute the "throat forming portion" according to the above configurations (1) to (3).

The above configuration (4) aims at solving the problem of improving efficiency of a turbine by suppressing heat radiation of the exhaust gas, which is different from the above-described problem (improving formability of the inner wall shape of the turbine housing).

That is, with the above configuration (4), since the heat shield portion including the first heat-shielding plate portion and the second heat-shielding plate portion is positioned on the opposite side of the outlet portion in the axial direction across at least one of the turbine impeller or the scroll flow passage, it is possible to suppress heat radiation of the exhaust gas flowing through the scroll flow passage and the turbine impeller. Moreover, an intermediate layer is formed by the gap at least partially interposed between the first heat-shielding plate portion and the second heat-shielding plate portion, making it possible to suppress heat transfer from the one heat-shielding plate portion to the other heat-shielding plate portion. Therefore, it is possible to improve efficiency of the turbine by suppressing outward heat radiation of the exhaust gas.

(5) In some embodiments, in the above configuration (4), the turbine further includes a bearing housing disposed on an opposite side of the outlet portion of the turbine housing in the axial direction.

The first heat-shielding plate portion and the second heat-shielding plate portion are configured such that a first end part of the first heat-shielding plate portion and a second end part of the second heat-shielding plate portion are fixed to be interposed between the turbine housing and the bearing housing, and at least one of a first surface of the first end part or a second surface of the second end part has a recess, the first surface and the second surface facing each other.

With the above configuration (5), since at least one of the surfaces (the first surface and the second surface) facing each other has the recess in the first end part and the second end part interposed between the turbine housing and the bearing housing, it is possible to reduce, with the recess, an area where the first surface and the second surface contact. Thus, it is possible to suppress heat transfer from one of the first end part or the second end part to the other. Therefore, it is possible to suppress heat transfer from the turbine housing to the bearing housing and to improve efficiency of the turbine.

(6) In some embodiments, in the above configuration (5), the first surface of the first heat-shielding plate portion has a first recess extending in one of a circumferential direction or a radial direction, and the second surface of the second heat-shielding plate portion has a second recess extending in the other of the circumferential direction or the radial direction.

With the above configuration (6), the first surface of the first heat-shielding plate portion has the first recesses an extending direction of which differs from the one of the second recess disposed in the second surface of the second heat-shielding plate portion. Thus, it is possible to effectively reduce the area where the first surface and the second surface contact each other in the first end part and the second end part interposed between the turbine housing and the bearing housing. Therefore, it is possible to further suppress heat transfer from the turbine housing to the bearing housing.

(7) In some embodiments, in any one of the above configurations (4) to (6), the turbine further includes a heat insulating material disposed in the gap.

With the above configuration (7), since the heat insulating material is disposed in the gap between the first heat-shielding plate portion and the second heat-shielding plate portion, it is possible to effectively suppress heat transfer from one heat-shielding plate portion to the other heat-shielding plate portion. Therefore, it is possible to improve the effect of suppressing heat radiation of the exhaust gas.

(8) In some embodiments, in any one of the above configurations (4) to (7), the turbine further includes a bearing housing disposed on an opposite side of the outlet portion of the turbine housing in the axial direction, the first heat-shielding plate portion has a first end part, and the second heat-shielding plate portion has a second end part, the first end part and the second end part being fixed to be interposed between the turbine housing and the bearing housing, and the gap is formed between at least a part of a section of the first heat-shielding plate portion except for the first end part and at least a part of a section of the second heat-shielding plate portion except for the second end part.

With the above configuration (8), the gap is formed in at least a part of a section except for the first end part of the first heat-shielding plate portion and the second end part of the second heat-shielding plate portion interposed between the turbine housing and the bearing housing. Thus, since the gap is formed in a section of each of the heat-shielding plate portions which is easily exposed to the exhaust gas flowing through the scroll flow passage, the back surface of the turbine impeller, and the like, it is possible to effectively suppress heat radiation of the exhaust gas.

(9) In some embodiments, in the above configuration (8), the turbine further includes a heat insulating material disposed in the gap between the first heat-shielding plate portion and the second heat-shielding plate portion, the first heat-shielding plate portion and the second heat-shielding plate portion respectively have end parts coupled to each other on an opposite side of the first end part and the second end part interposed between the turbine housing and the bearing housing.

With the above configuration (9), it is possible to prevent the heat insulating material disposed in the gap between the first heat-shielding plate portion and the second heat-shielding plate portion from falling off between the end parts on the opposite side of the first end part and the second end part.

(10) In some embodiments, in the above configuration (8), each of the first heat-shielding plate portion and the second heat-shielding plate portion has an end part which is a free end on an opposite side of the first end part or the second end part interposed between the turbine housing and the bearing housing.

With the above configuration (10), the end part on the opposite side of the first end part or the second end part interposed between the turbine housing and the bearing housing is the free end and is not fixed. Therefore, it is possible to allow thermal deformation in the first heat-shielding plate portion and the second heat-shielding plate portion caused by heat input by the exhaust gas, and to reduce thermal stress of the first heat-shielding plate portion and the second heat-shielding plate portion, making it possible to improve durability of each of the heat-shielding plate portions.

(11) In some embodiments, in any one of the above configurations (4) to (10), the first heat-shielding plate portion is disposed so as to at least partially face the scroll flow passage, and the second heat-shielding plate portion is disposed so as to at least partially face a back surface of the turbine impeller on an inner side of the first heat-shielding plate portion in a radial direction.

In this case, the first heat-shielding plate portion may constitute the "throat forming portion" in the above configurations (1) to (3).

Comparing a region facing the scroll flow passage and a region facing the back surface of the turbine impeller, the region facing the scroll flow passage before the exhaust gas is introduced to the turbine impeller has a higher heat-transfer coefficient which defines a heat input amount from the exhaust gas.

Thus, it is possible to effectively suppress heat radiation from the exhaust gas by disposing the first heat-shielding plate portion in the region facing the scroll flow passage with the high heat-transfer coefficient and disposing the second heat-shielding plate portion via the gap with respect to the first heat-shielding plate portion as in the above configuration (11).

(12) In some embodiments, in any one of the above configurations (4) to (10), at least one of the first heat-shielding plate portion or the second heat-shielding plate portion has a heat-shielding coating.

With the above configuration (12), it is possible to further enhance the effect of suppressing heat radiation of the exhaust gas by the first heat-shielding plate portion and the second heat-shielding plate portion, and to improve efficiency of the turbine.

(13) A turbocharger according to some embodiments of the present invention includes the turbine according to any one of the above configurations (1) to (12) and a compressor including a compressor impeller and configured to be driven by the turbine.

With the above configuration (13), as described in the above configurations (1) to (12), in the throat portion of scroll flow passage having the smaller width in the axial direction than the other sections, the hub-side wall surface facing the shroud-side wall surface can be formed by the throat forming portion which is provided as the separate piece from the turbine housing. Thus, even if the turbine is downsized, it is possible to facilitate formation of the core forming the inner wall shape upon casting the turbine housing and to enhance formability of the inner wall shape of the turbine housing.

Alternatively, as described in the above configuration (4), since the heat shield portion including the first heat-shielding plate portion and the second heat-shielding plate portion is positioned on the opposite side of the outlet portion in the axial direction across at least one of the turbine impeller or the scroll flow passage, it is possible to suppress heat radiation of the exhaust gas flowing through the scroll flow passage and the turbine impeller. Moreover, the intermediate layer is formed by the gap at least partially interposed between the first heat-shielding plate portion and the second heat-shielding plate portion, making it possible to suppress heat transfer from the one heat-shielding plate portion to the other heat-shielding plate portion. Therefore, it is possible to improve efficiency of the turbine by suppressing outward heat radiation of the exhaust gas.

Advantageous Effects

According to at least one embodiment of the present invention, it is to provide a turbine housing and a turbocharger including the same capable of improving formability of an inner wall shape of the turbine housing by casting while promoting downsizing of a turbocharger.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First Embodiment

Figure 1:
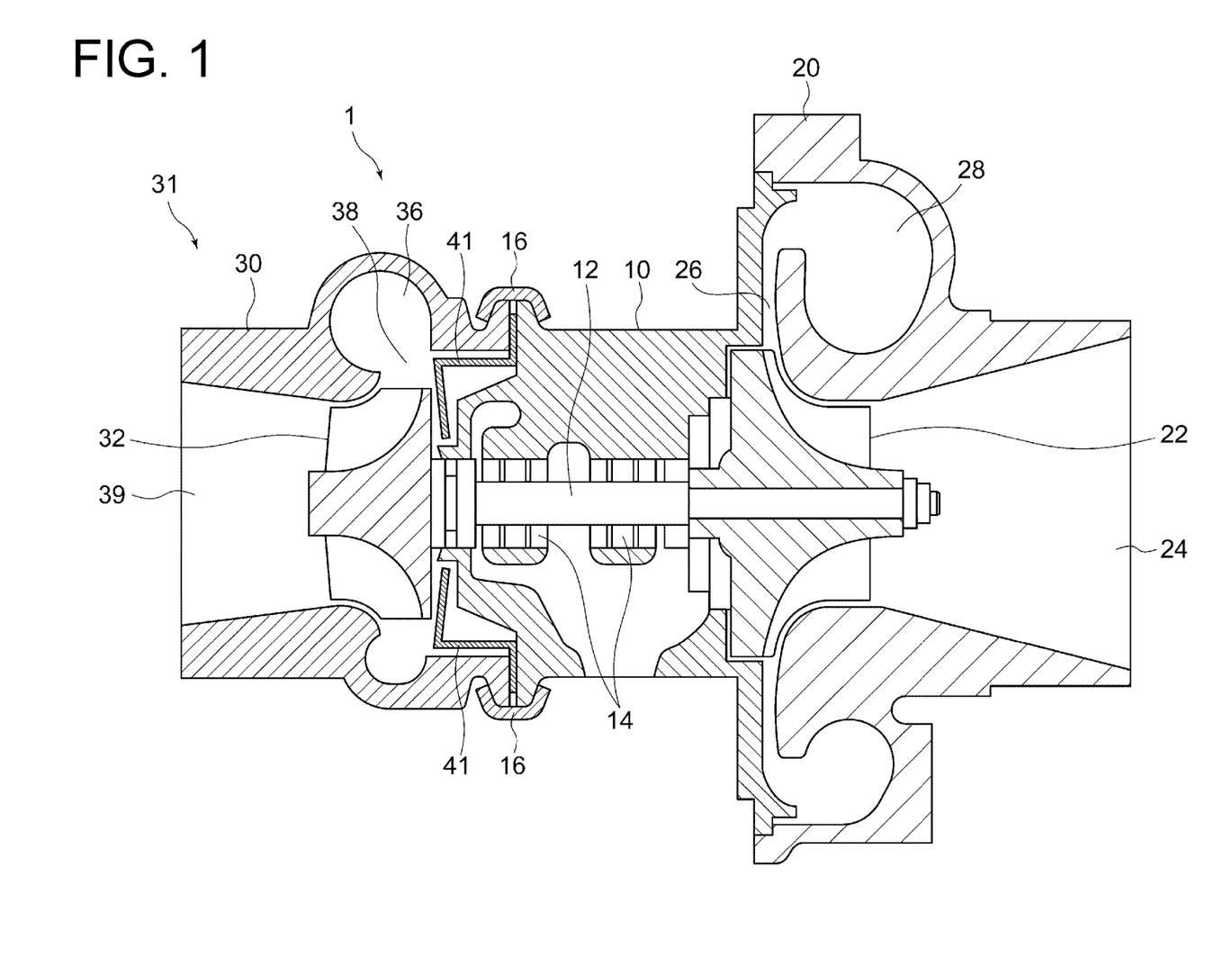
FIG. 1 is a schematic cross-sectional view of the overall configuration of a turbocharger to which a turbine is applied according to an embodiment.

First, the overall configuration of a turbocharger to which a turbine is applied according to some embodiments will be described with reference to FIG. 1. FIG. 1 is a view showing the schematic configuration of a turbocharger 1 to which a turbine 31 is applied according to an embodiment.

As shown in FIG. 1, the turbocharger 1 according to some embodiments of the present invention includes a compressor housing 20 and a turbine housing 30 arranged across a bearing housing 10. A rotational shaft 12 includes a turbine impeller 32 housed in the turbine housing 30 at one end and includes a compressor impeller 22 housed in the compressor housing 20 at the other end. The rotational shaft 12, the turbine impeller 32, and the compressor impeller 22 are coupled or linked to each other, thereby forming a single-piece as a whole. The rotational shaft 12 is rotatably supported by bearings 14 disposed in the bearing housing 10.

In the compressor housing 20, an air inlet portion 24 for introducing air into the compressor housing 20 is formed. Air compressed by the rotation of the compressor impeller 22 passes through a diffuser flow passage 26 and a compressor scroll flow passage 28, and is discharged to the outside of the compressor housing 20 via an air outlet portion (not shown).

In the turbine housing 30, a gas inlet portion (not shown) for introducing an exhaust gas from an engine (not shown) into the turbine housing 30 is formed. The gas inlet portion can be connected to an exhaust manifold (not shown) of the engine. In addition, in an outer circumferential part of the turbine impeller 32 in the turbine housing 30, a turbine scroll flow passage 36 of a spiral shape is disposed so as to cover the turbine impeller 32. The scroll flow passage 36 communicates with the gas inlet portion and is formed so as to internally introduce the exhaust gas. On the inner side of the scroll flow passage 36 in the radial direction, a throat portion 38 for guiding the exhaust gas from the scroll flow passage 36 to the turbine impeller 32 is disposed. The throat portion 38 is a section of the scroll flow passage 36 having a smaller width than other sections in the axial direction. The exhaust gas via the turbine impeller 32 is discharged to the outside of the turbine housing 30 via a gas outlet portion 39.

As described above, the turbocharger 1 can transmit a rotational force to the compressor impeller 22 via the rotational shaft 12 by rotary driving the turbine impeller 32 with the exhaust gas of the engine, centrifugally compress air entering the compressor housing 20, and supply the compressed air to the engine.

Figure 2:
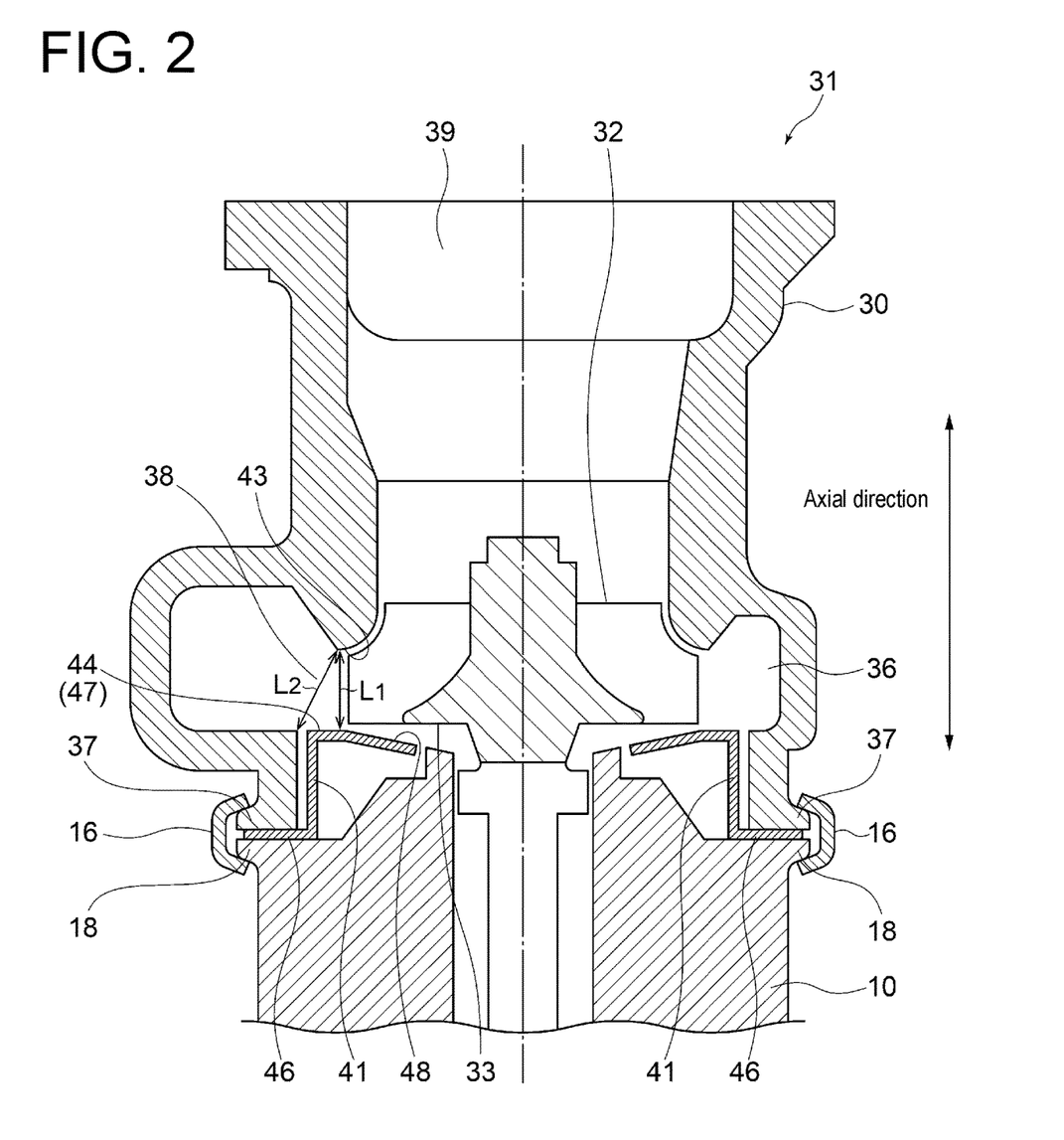
FIG. 2 is an enlarged view of the vicinity of the turbine in the turbocharger of FIG. 1.

FIG. 2 is an enlarged view of the vicinity of the turbine 31 in the turbocharger 1. As shown in FIG. 2, in some embodiments, the turbine 31 includes a throat forming portion 41 which is provided as a separate piece from the turbine housing 30. The throat forming portion 41 is disposed to face a section of the turbine housing 30 and forms a hub-side wall surface 44 of the throat portion 38 in an axial direction. The section forms a shroud-side wall surface 43 of the throat portion 38 of the scroll flow passage 36.

If both the shroud-side wall surface 43 and the hub-side wall surface 44 of the throat portion 38 are formed by the turbine housing 30, the throat portion 38 having a relatively small width is formed by an inner wall shape of the turbine housing 30. Since the turbine housing 30 is typically formed by casting, feasibility of a core forming the inner wall shape of the turbine housing 30 is important. However, if the turbocharger 1 is downsized upon the recent requirement, it may become difficult to form the core forming the inner wall shape of the turbine housing 30, resulting in a decrease in feasibility of the core. In particular, since the throat portion 38 of the scroll flow passage 36 has the smaller width than the other sections, feasibility of the core owing to downsizing of the turbocharger 1 is likely to raise an issue.

A core forming an inner wall shape of the scroll flow passage 36 is constricted in the vicinity of the throat portion 38. If both the shroud-side wall surface 43 and the hub-side wall surface 44 of the throat portion 38 are formed by the turbine housing, the minimum width of the constriction of the core in the axial direction is an interval L1 between the shroud-side wall surface 43 and the hub-side wall surface 44.

On the other hand, according to the present embodiment, in the throat portion 38, the hub-side wall surface 44 facing the shroud-side wall surface 43 can be formed by the throat forming portion 41 which is provided as the separate piece from the turbine housing 30. In this case, only the shroud-side wall surface 43 of the throat portion 38 can be formed by the inner wall shape of the turbine housing 30, making it possible to set the minimum width of the constriction of the core in the axial direction to L2 which is larger than L1.

Thus, according to the present embodiment, even if the turbine 31 tends to be downsized, it is possible to facilitate formation of the core forming the inner wall shape upon casting the turbine housing 30. Therefore, it is possible to enhance formability of the inner wall shape of the turbine housing 30. Moreover, it is also possible to enhance the strength of the core itself repeatedly used for casting by increasing the minimum width of the constriction of the core in the vicinity of the throat portion 38.

In some embodiments, as shown in FIG. 2, the throat forming portion 41 includes a first part 47 forming the hub-side wall surface 44 of the throat portion 38 and a second part 48 facing a back surface 33 of the turbine impeller 32 on the inner side of the first part 47 in the radial direction.

According to the present embodiment, since the throat forming portion 41 includes the first part 47 forming the hub-side wall surface 44 of the throat portion 38 and the second part 48 facing the back surface 33 of the turbine impeller 32, it is possible to use the throat forming portion 41 as a portion facing the back surface 33 of the turbine impeller 32 as well. With such a simple structure, it is possible to improve feasibility of the core in casting of the turbine housing 30 and to suppress heat radiation of the exhaust gas on the side of the back surface 33 of the turbine impeller 32.

In some embodiments, the throat forming portion 41 also includes a plate member forming the hub-side wall surface 44 of the throat portion 38. In the exemplary embodiment of FIG. 2, the throat forming portion 41 is shaped by a member forming a plate shape as a whole, and an end part 46 on the other side of the throat forming portion 41 in the radial direction is fixed to be interposed between an interposing portion 37 of the turbine housing 30 and an interposing portion 18 of the bearing housing 10. The turbine housing 30 and the bearing housing 10 are coupled by fastening the interposing portions (18, 37) with a clamp 16.

According to the present embodiment, since the plate-like member can be adopted as the throat forming portion 41, it is possible to form the hub-side wall surface 44 of the throat portion 38 by using a sheet metal product. The sheet metal product includes, for example, a generally used back plate as shown in the specific example of FIG. 2.

Second Embodiment

Figure 3:
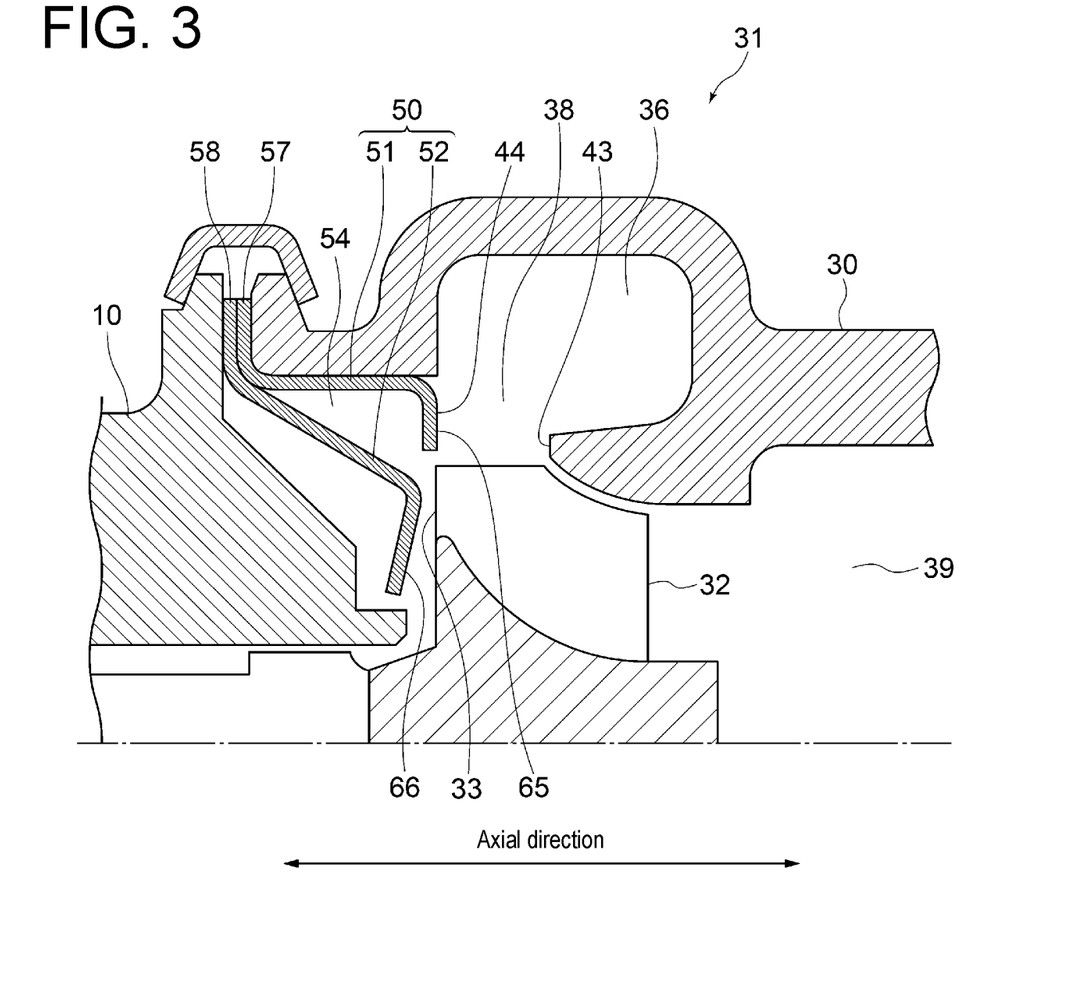
FIG. 3 is a view of the turbine including a heat shield portion according to some embodiments.
Figure 4:
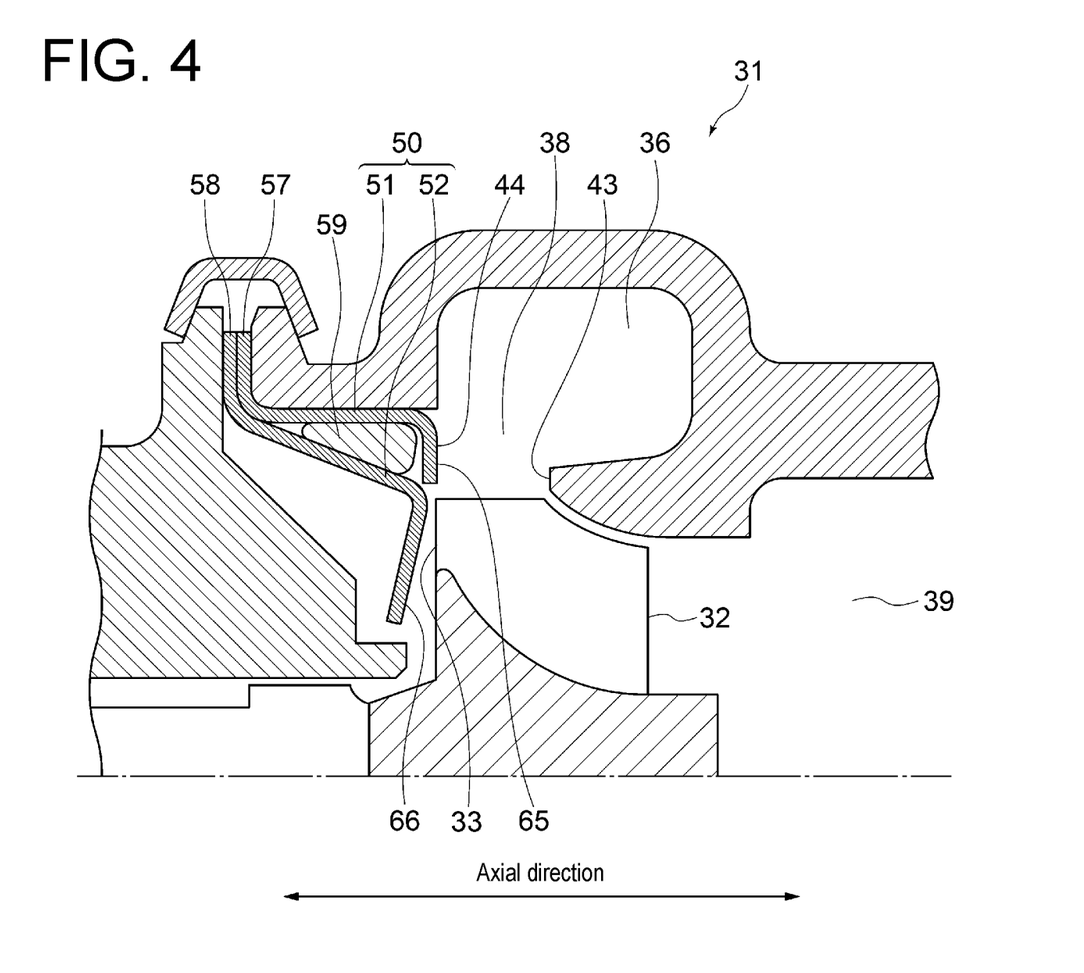
FIG. 4 is a view showing the configuration of the heat shield portion with a heat insulating material according to some embodiments.
Figure 5:
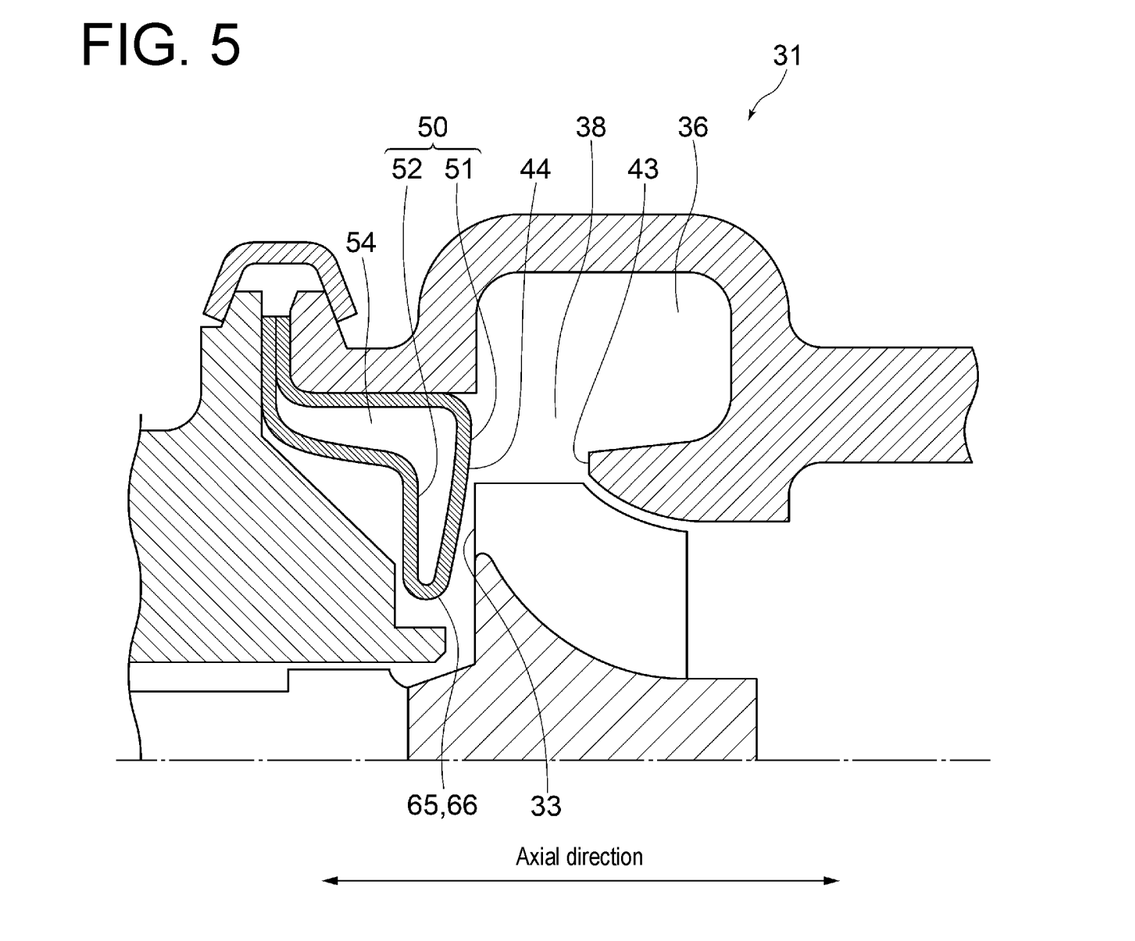
FIG. 5 is a view showing a modified example of the heat shield portion according to some embodiments.
Figure 6:
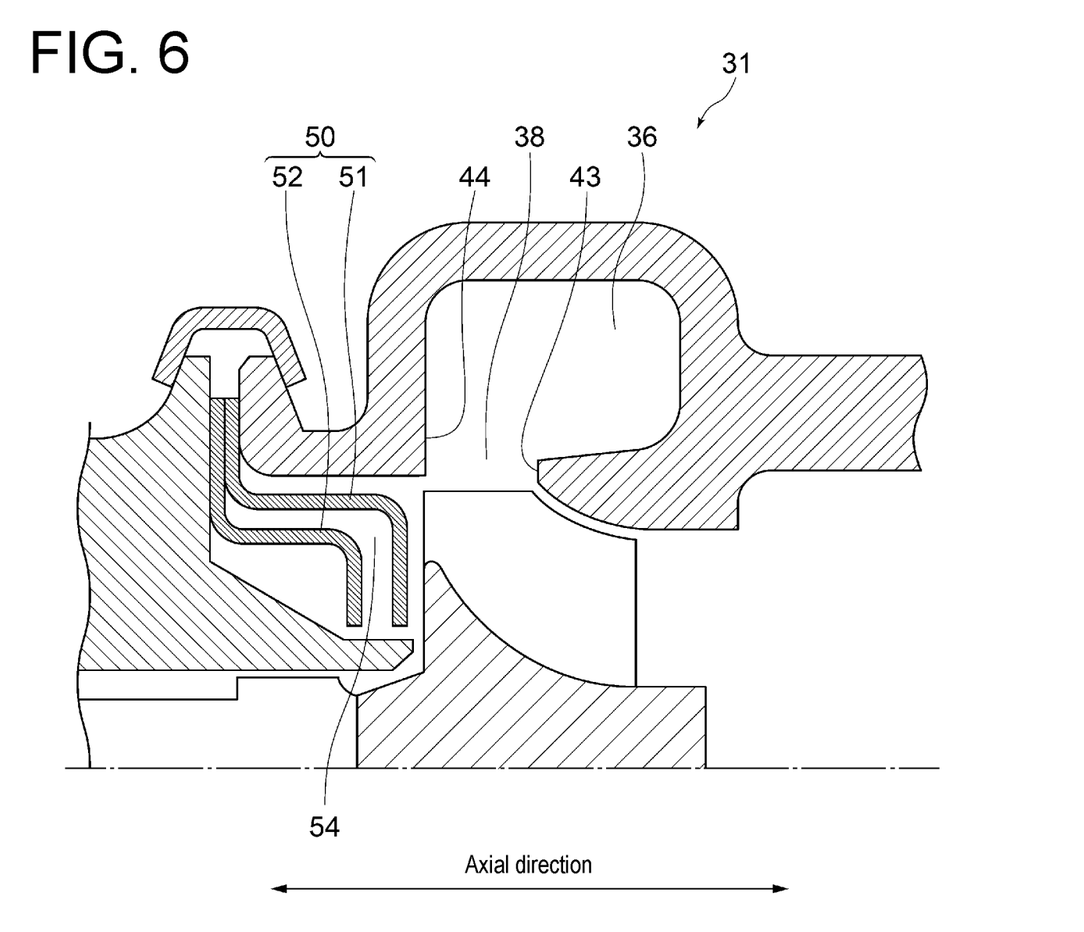
FIG. 6 is a view showing another modified example of the heat shield portion according to some embodiments.

The second embodiment to be described next aims at solving the problem of improving efficiency of the turbine 31 by suppressing heat radiation of an exhaust gas, which is different from the problem (improving formability of the inner wall shape of the turbine housing 30) to be solved by the first embodiment described above. The configuration of the heat shield portion 50 in the second embodiment will be described with reference to FIGS. 3 to 6. FIG. 3 is a view of the turbine 31 including the heat shield portion 50 according to some embodiments. FIG. 4 is a view showing the configuration of the heat shield portion 50 with the heat insulating material 59 according to some embodiments. FIG. 5 is a view showing a modified example of the heat shield portion 50 according to some embodiments. FIG. 6 is a view showing another modified example of the heat shield portion 50 according to some embodiments.

In some embodiments, as shown in FIG. 3, the turbine 31 includes the heat shield portion 50 positioned on an opposite side of a gas outlet portion 39 in the axial direction across at least one of the turbine impeller 32 or a scroll flow passage 36 communicating with the turbine impeller 32. The heat shield portion 50 includes a first heat-shielding plate portion 51 and a second heat-shielding plate portion 52 arranged to at least partially have a gap 54 with the first heat-shielding plate portion 51.

In an embodiment of FIG. 3, the first heat-shielding plate portion 51 is disposed on the opposite side of the gas outlet portion 39 in the axial direction across the scroll flow passage 36, and the second heat-shielding plate portion 52 is disposed likewise on the opposite side of the gas outlet portion 39 across the turbine impeller 32. Moreover, the respective heat-shielding plate portions (51, 52) are arranged so as to generate the gap 54 in a region on the radially inner side of the first heat-shielding plate portion 51 and the radially outer side of the second heat-shielding plate portion 52.

According to the present embodiment, since the heat shield portion 50 including the first heat-shielding plate portion 51 and the second heat-shielding plate portion 52 is positioned on the opposite side of the gas outlet portion 39 in the axial direction across at least one of the turbine impeller 32 or the scroll flow passage 36, it is possible to suppress heat radiation of the exhaust gas flowing through the scroll flow passage 36 and the turbine impeller 32. Moreover, an intermediate layer is formed by the gap 54 at least partially interposed between the first heat-shielding plate portion 51 and the second heat-shielding plate portion 52, making it possible to suppress heat transfer from the one heat-shielding plate portion to the other heat-shielding plate portion. Therefore, it is possible to improve efficiency of the turbine 31 by suppressing outward heat radiation of the exhaust gas.

In some embodiments, as shown in FIG. 3 in the same manner, the turbine 31 includes the bearing housing 10 disposed on the opposite side of the gas outlet portion 39 of the turbine housing 30 in the axial direction. The first heat-shielding plate portion 51 has a first end part 57, and the second heat-shielding plate portion 52 has a second end part 58. The first end part 57 and the second end part 58 are fixed to be interposed between the turbine housing 30 and the bearing housing 10. The gap 54 is formed between at least a part of a section of the first heat-shielding plate portion 51 except for the first end part 57 and at least a part of a section of the second heat-shielding plate portion 52 except for the second end part 58.

According to the present embodiment, since the gap 54 is formed in a section of each of the heat-shielding plate portions (51, 52) which is easily exposed to the exhaust gas flowing through the scroll flow passage 36, a back surface 33 of the turbine impeller 32, and the like, it is possible to effectively suppress heat radiation of the exhaust gas.

Moreover, each of the first heat-shielding plate portion 51 and the second heat-shielding plate portion 52 has an end part (65, 66) which is a free end on an opposite side of the first end part 57 or the second end part 58 interposed between the turbine housing 30 and the bearing housing 10.

Thus, it is possible to allow thermal deformation in the first heat-shielding plate portion 51 and the second heat-shielding plate portion 52 caused by heat input by the exhaust gas, and to reduce thermal stress of the first heat-shielding plate portion 51 and the second heat-shielding plate portion 52, making it possible to improve durability of each of the heat-shielding plate portions (51, 52).

The turbine 31 according to some embodiments includes the heat insulating material 59 disposed in the gap 54. According to the present embodiment, it is possible to effectively suppress heat transfer from one heat-shielding plate portion to the other heat-shielding plate portion. Moreover, heat transfer owing to radiation easily occurs in the gap 54 disposed between the first heat-shielding plate portion 51 and the second heat-shielding plate portion 52. Thus, with the objective of suppressing the heat transfer, it is effective to adopt the heat insulating material 59 in the gap 54. As a result, according to the present embodiment, it is possible to obtain a beneficial effect of suppressing heat radiation of the exhaust gas.

Further, in an embodiment, as illustrated in FIG. 4, the turbine 31 includes the heat insulating material 59 disposed in the gap 54 between the first heat-shielding plate portion 51 and the second heat-shielding plate portion 52, and the first heat-shielding plate portion 51 and the second heat-shielding plate portion 52 respectively have end parts (65, 66) coupled to each other on the opposite side of the first end part 57 and the second end part 58 interposed between the turbine housing 30 and the bearing housing 10.

According to the present embodiment, it is possible to prevent the heat insulating material 59 disposed in the gap 54 between the first heat-shielding plate portion 51 and the second heat-shielding plate portion 52 from falling off between the end parts (65, 66) on the opposite side of the first end part 57 and the second end part 58.

In the exemplary embodiments shown in FIGS. 3 and 4, the first heat-shielding plate portion 51 and the second heat-shielding plate portion 52 are made of separate pieces. However, the specific configuration of the heat shield portion 50 is not limited to the present example. That is, as in a modified example shown in FIG. 5, the heat shield portion 50 including the first heat-shielding plate portion 51 and the second heat-shielding plate portion 52 may be formed by bending one plate-like member. Also in this case, as the embodiment shown in FIG. 4, the end parts (65, 66) of the first heat-shielding plate portion 51 and the second heat-shielding plate portion 52 are coupled to each other.

In some embodiments, at least one of the first heat-shielding plate portion 51 or the second heat-shielding plate portion 52 may have a heat-shielding coating. It is possible to suppress heat radiation more effectively by forming a coating serving as a heat barrier on each of the heat-shielding plate portions (51, 52).

In some embodiments, as shown in FIGS. 3 to 5, the first heat-shielding plate portion 51 is disposed so as to at least partially face the scroll flow passage 36, and the second heat-shielding plate portion 52 is disposed so as to at least partially face the back surface 33 of the turbine impeller 32 on an inner side of the first heat-shielding plate portion 51 in the radial direction.

Comparing a region facing the scroll flow passage 36 and a region facing the back surface 33 of the turbine impeller 32, the region facing the scroll flow passage 36 before the exhaust gas is introduced to the turbine impeller 32 has a higher heat-transfer coefficient which defines a heat input amount from the exhaust gas.

Thus, it is possible to effectively suppress heat radiation from the exhaust gas by disposing the first heat-shielding plate portion 51 in the region facing the scroll flow passage 36 with the high heat-transfer coefficient and disposing the second heat-shielding plate portion 52 via the gap 54 with respect to the first heat-shielding plate portion 51 as in the present embodiment.

In the present embodiment, the first heat-shielding plate portion 51 may constitute the throat forming portion 41 in the first embodiment. FIGS. 3 to 5 each show an example in which the first heat-shielding plate portion 51 forms the hub-side wall surface 44 of the throat portion 38 as the throat forming portion 41, instead of the turbine housing 30. According to the present embodiment, it is not only possible to effectively enjoy the effect of suppressing heat radiation of the exhaust gas, but it is also possible to promote downsizing of the turbine 31 since feasibility of the core is improved upon casting the turbine housing 30 as already described in the first embodiment.

Further, in an embodiment, as shown in FIG. 3, the first heat-shielding plate portion 51 is disposed so as to at least partially face the scroll flow passage 36, the second heat-shielding plate portion 52 is disposed so as to at least partially face the back surface 33 of the turbine impeller 32 on the inner side of the first heat-shielding plate portion 51 in the radial direction, and then the end parts (65, 66) on the opposite side of the first end part 57 and the second end part 58 interposed between the turbine housing 30 and the bearing housing 10 are the free ends.

Since the exhaust gas has a relatively higher temperature in the region facing the scroll flow passage 36 than in the region facing the back surface 33 of the turbine impeller 32, the way in which the heat shield portion 50 is thermally deformed is different between both the regions. Thus, it is desirable to adopt a configuration for suppressing interference with the turbine impeller 32 in consideration of the difference in the way of thermal deformation if the heat shield portion 50 is disposed in both the regions.

In this regard, according to the present embodiment, it is possible to dispose the first heat-shielding plate portion 51 in the region with the relatively high temperature and to dispose the second heat-shielding plate portion 52 in the region with the relatively low temperature. In addition, since the end parts 65, 66 are the free ends without being fixed to each other, allowing the first heat-shielding plate portion 51 and the second heat-shielding plate portion 52 to respectively absorb the way of thermal deformation which is different depending on the temperature of the exhaust gas. Therefore, with the simple configuration described above, it is possible to suppress the interference with the turbine impeller 32 owing to thermal deformation in each of the heat-shielding plate portions (51, 52) while effectively suppressing radiation of the exhaust gas.

Some configurations according to the second embodiment have been described above with reference to FIGS. 3 to 5. However, as illustrated in FIGS. 3 to 5, the second embodiment is not limited to an illustrative embodiment in which the first heat-shielding plate portion 51 forms the hub-side wall surface 44 of the throat portion 38 and is also applicable to a case in which the turbine housing 30 itself forms the hub-side wall surface 44 of the throat portion 38. In this case, as illustrated in FIG. 6, both the first heat-shielding plate portion 51 and the second heat-shielding plate portion 52 may be disposed with a gap 54 so as to face the side of the back surface 33 of the turbine impeller 32.

Figure 7:
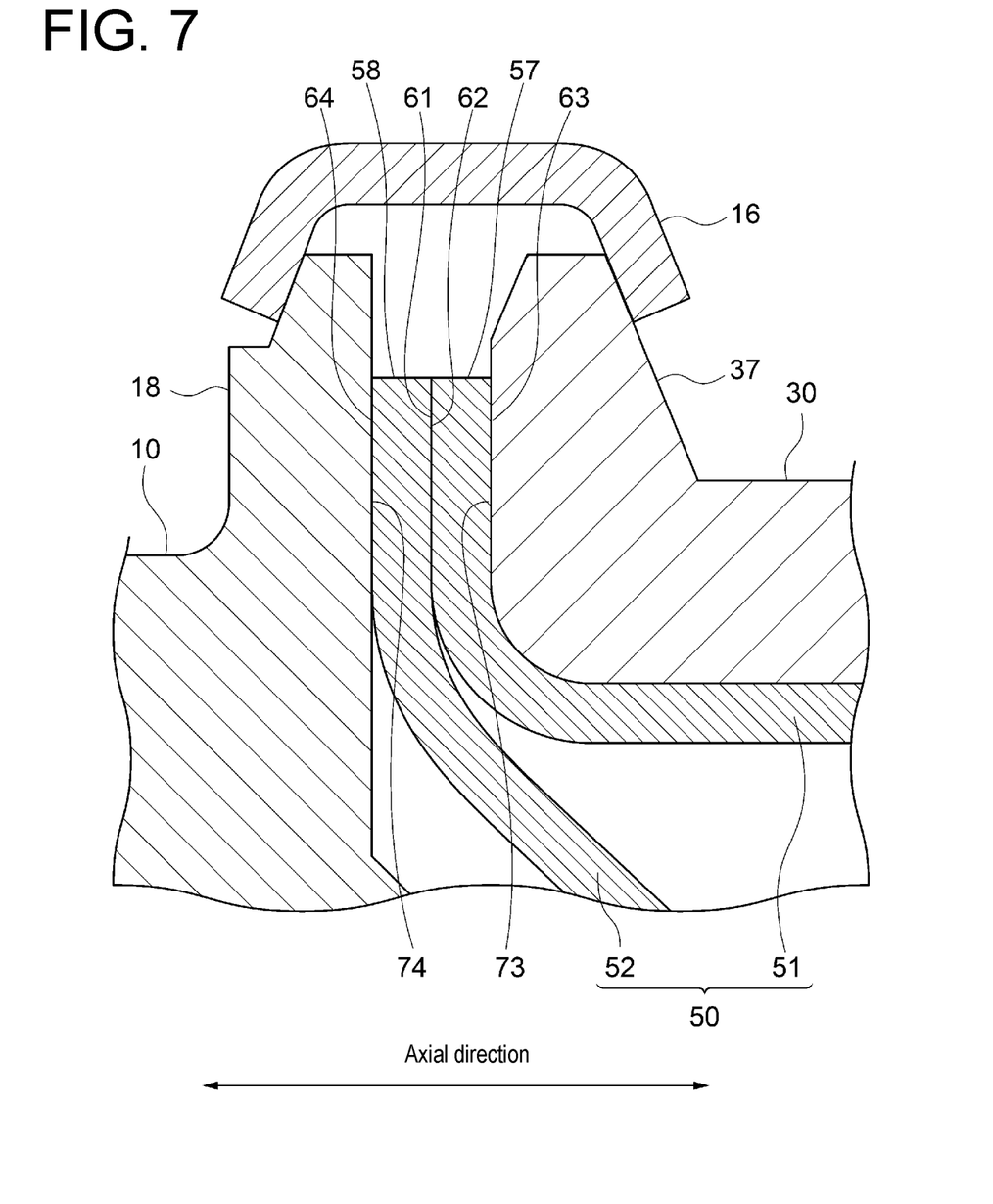
FIG. 7 is an enlarged view of the vicinity of a first end part and a second end part in FIGS. 3 to 6.
Figure 8:
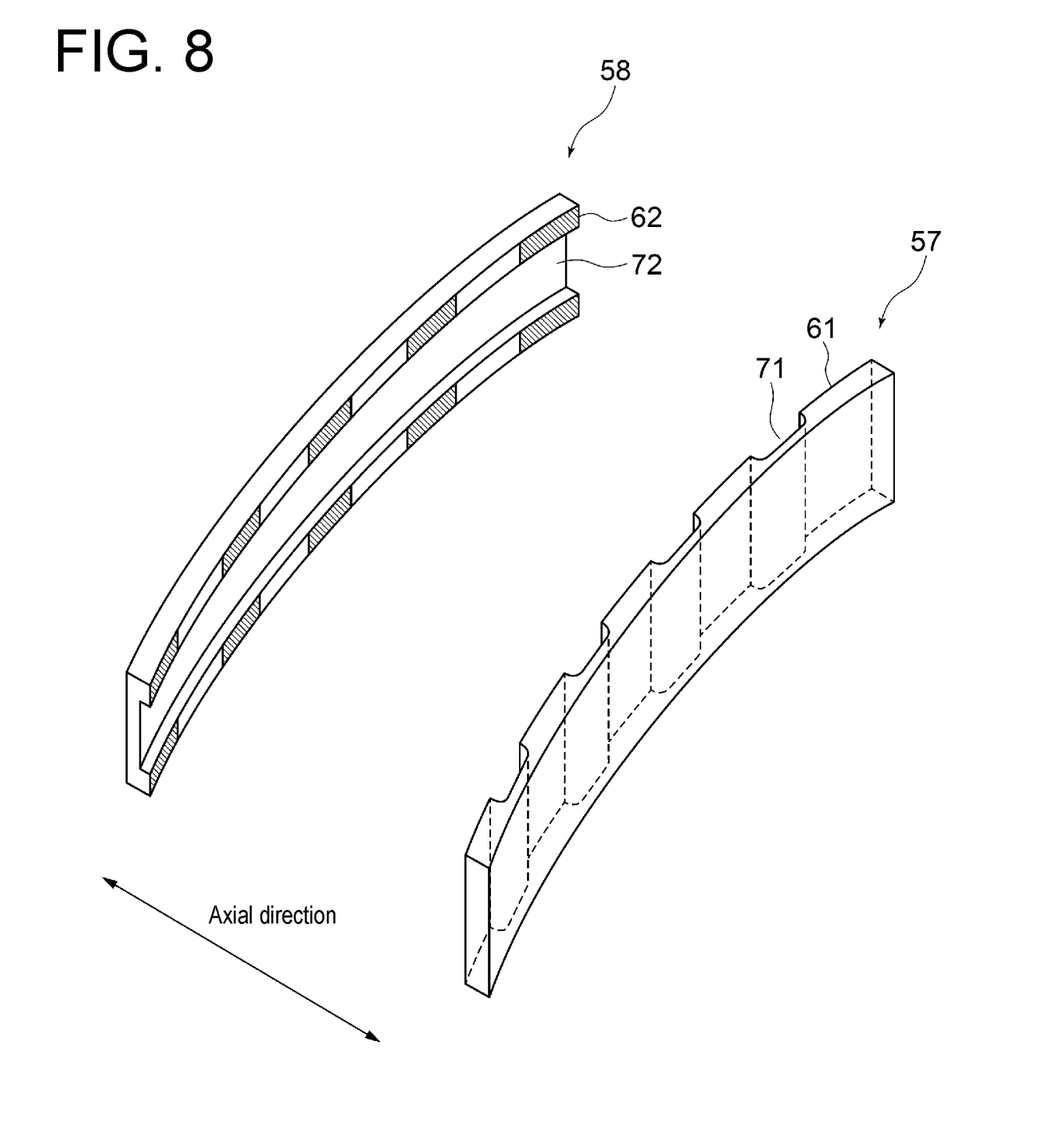
FIG. 8 is a perspective view showing the configuration of recesses in the end parts of the heat shield portion according to some embodiments.

Hereinafter, a structure in the first end part 57 of the first heat-shielding plate portion 51 and the second end part 58 of the second heat-shielding plate portion 52 according to some embodiments will be described with reference to FIGS. 7 and 8. FIG. 7 is an enlarged view of the vicinity of the first end part 57 and the second end part 58 in FIGS. 3 to 6. FIG. 8 is a perspective view showing the configuration of recesses in the end parts (57, 58) of the heat shield portion 50 according to some embodiments. Some embodiments to be described below are applicable to the respective configurations according to the second embodiment described above.

In some embodiments, as shown in FIGS. 7 and 8, the first heat-shielding plate portion 51 and the second heat-shielding plate portion 52 are configured such that the first end part 57 of the first heat-shielding plate portion 51 and the second end part 58 of the second heat-shielding plate portion 52 are fixed to be interposed between the turbine housing 30 and the bearing housing 10, and at least one of a first surface 61 of the first end part 57 or a second surface 62 of the second end part 58 has a recess. The first surface 61 and the second surface 62 face each other.

As shown in FIG. 7, in a portion between which the first end part 57 of the first heat-shielding plate portion 51 and the second end part 58 of the second heat-shielding plate portion 52 are interposed, the interposing portion 37 of the turbine housing 30 and the first end part 57 abut each other, and the interposing portion 18 of the bearing housing 10 and the second end part 58 abut each other. In addition, the first surface 61 of the first end part 57 and the second surface 62 of the second end part 58 also abut each other. Thus, heat from the side of the turbine housing 30 is easily transferred to the side of the bearing housing 10 via the interposing portions (18, 37) and the respective end parts (57, 58), and efficiency of the turbine 31 may be decreased.

In this regard, according to the present embodiment, since at least one of the surfaces (the first surface 61 and the second surface 62) facing each other has the recess in the first end part 57 and the second end part 58 interposed between the turbine housing 30 and the bearing housing 10, it is possible to reduce, with the recess, an area where the first surface 61 and the second surface 62 contact. Thus, it is possible to suppress heat transfer from one of the first end part 57 or the second end part 58 to the other. Therefore, it is possible to suppress heat transfer from the turbine housing 30 to the bearing housing 10 and to improve efficiency of the turbine 31.

The turbine 31 is configured such that a third surface 63 of the first end part 57 metal-touches an inner wall 73 of the interposing portion 37 of the turbine housing 30, and a fourth surface 64 of the second end part 58 metal-touches an inner wall 74 of the interposing portion 18 of the bearing housing 10, making it possible to suppress external leakage of the exhaust gas even if at least one of the first surface 61 or the second surface 62 has the recess.

In an embodiment, as shown in FIG. 8, the first surface 61 of the first heat-shielding plate portion 51 includes first recesses 71 extending in one of the circumferential direction or the radial direction, and the second surface 62 of the second heat-shielding plate portion 52 includes a second recess 72 extending in the other of the circumferential direction or the radial direction. In an example of FIG. 8, the first surface 61 includes the plurality of first recesses 71 extending in the radial direction, and the second surface 62 includes the one second recess 72 extending in the circumferential direction.

If the first surface 61 and the second surface 62 abut each other when the first end part 57 and the second end part 58 are interposed, portions where the first surface 61 and the second surface 62 actually contact each other are indicated by diagonal lines on the second surface 62 of FIG. 8 in the example of FIG. 8, making it possible to reduce a mutual contact area. Thus, according to the present embodiment, since the first surface 61 of the first heat-shielding plate portion 51 has the first recesses 71 an extending direction of which differs from the one of the second recess 72 disposed in the second surface 62 of the second heat-shielding plate portion 52, it is possible to effectively reduce the area where the first surface 61 and the second surface 62 contact each other. Therefore, it is possible to further suppress heat transfer from the turbine housing 30 to the bearing housing 10.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "containing" or "having" one constitutional element is not an exclusive expression that excludes the presence of other constitutional elements.

REFERENCE SIGNS LIST

1 Turbocharger
10 Bearing housing
12 Rotational shaft
14 Bearing
16 Clamp
18 Interposing portion
20 Compressor housing
22 Compressor impeller
24 Air inlet portion 26 Diffuser flow passage
28 Scroll flow passage
30 Turbine housing
31 Turbine
32 Turbine impeller
33 Back surface
36 Scroll flow passage
37 Interposing portion
38 Throat portion
39 Gas outlet portion
41 Throat forming portion
43 Shroud-side wall surface
44 Hub-side wall surface
46 End part
47 First part
58 Second part
50 Heat shield portion
51 First heat-shielding plate portion
52 Second heat-shielding plate portion
54 Gap
57 First end part
58 Second end part
59 Heat insulating material
61 First surface
62 Second surface
71 First recess
72 Second recess

The invention claimed is:

1. A turbine comprising:
  a turbine impeller;
  a turbine housing disposed so as to cover the turbine impeller and including an outlet portion for discharging an exhaust gas having passed through the turbine impeller; and
  a heat shield portion positioned on an opposite side of the outlet portion in an axial direction across at least one of the turbine impeller or a scroll flow passage communicating with the turbine impeller,
  wherein the heat shield portion includes:
  a first heat-shielding plate portion which is disposed while facing the scroll flow passage to face a section of the turbine housing and forms a hub-side wall surface of a throat portion of the scroll flow passage in the axial direction, the section forming a shroud-side wall surface of the throat portion; and
  a second heat-shielding plate portion arranged to at least partially have a gap with the first heat-shielding plate portion; and a bearing housing disposed on an opposite side of the outlet portion of the turbine housing in the axial direction, wherein the first heat-shielding plate portion and the second heat-shielding plate portion are configured such that a first end part of the first heat-shielding plate portion and a second end part of the second heat-shielding plate portion are fixed to be interposed between the turbine housing and the bearing housing, and at least one of a first surface of the first end part or a second surface of the second end part has a recess, the first surface and the second surface facing each other.

2. The turbine according to claim 1,
  wherein the first surface of the first heat-shielding plate portion has a first recess extending in one of a circumferential direction or a radial direction, and
  wherein the second surface of the second heat-shielding plate portion has a second recess extending in the other of the circumferential direction or the radial direction.

3. The turbine according to claim 1, further comprising a bearing housing disposed on an opposite side of the outlet portion of the turbine housing in the axial direction,
  wherein the first heat-shielding plate portion has the first end part, and the second heat-shielding plate portion has the second end part, the first end part and the second end part being fixed to be interposed between the turbine housing and the bearing housing, and
  wherein the gap is formed between at least a part of a section of the first heat-shielding plate portion except for the first end part and at least a part of a section of the second heat-shielding plate portion except for the second end part.

4. The turbine according to claim 3,
  wherein each of the first heat-shielding plate portion and the second heat-shielding plate portion has an end part which is a free end on an opposite side of the first end part or the second end part interposed between the turbine housing and the bearing housing.

5. The turbine according to claim 1,
  wherein the second heat-shielding plate portion is disposed so as to at least partially face a back surface of the turbine impeller on an inner side of the first heat-shielding plate portion in a radial direction.

6. The turbine according to claim 1,
  wherein at least one of the first heat-shielding plate portion or the second heat-shielding plate portion has a heat-shielding coating.

7. A turbocharger comprising:
  the turbine according to claim 1; and
  a compressor including a compressor impeller and configured to be driven by the turbine.

* * * * *